United States Patent
Donahue et al.

(10) Patent No.: US 7,267,112 B2
(45) Date of Patent: Sep. 11, 2007

(54) EVAPORATIVE EMISSIONS CONTROL SYSTEM INCLUDING A CHARCOAL CANISTER FOR SMALL INTERNAL COMBUSTION ENGINES

(75) Inventors: Ronald J. Donahue, Fond du Lac, WI (US); Todd L. Carpenter, Gregory, MI (US); J. David Kirk, Fond du Lac, WI (US); Gregory C. Hintz, New Holstein, WI (US)

(73) Assignee: Tecumseh Products Company, Tecumseh, MI (US)

( * ) Notice: Subject to any disclaimer, the term of this patent is extended or adjusted under 35 U.S.C. 154(b) by 129 days.

(21) Appl. No.: 11/035,655

(22) Filed: Jan. 14, 2005

(65) Prior Publication Data

US 2005/0178368 A1    Aug. 18, 2005

Related U.S. Application Data

(60) Provisional application No. 60/559,505, filed on Apr. 5, 2004, provisional application No. 60/540,994, filed on Feb. 2, 2004.

(51) Int. Cl.
  *F02M 33/02*    (2006.01)
(52) U.S. Cl. .................. 123/518; 123/519; 123/520
(58) Field of Classification Search .............. 123/516, 123/517, 518, 519, 520
  See application file for complete search history.

(56) References Cited

U.S. PATENT DOCUMENTS

| | | | | |
|---|---|---|---|---|
| 2,675,093 A | * | 4/1954 | McCall et al. ............... 96/139 |
| 3,540,423 A |   | 11/1970 | Tolles, III .................. 123/136 |
| 3,546,853 A | * | 12/1970 | Claar ......................... 55/419 |
| 3,572,014 A |   | 3/1971 | Hansen ....................... 55/316 |
| 3,575,152 A | * | 4/1971 | Wentworth ................. 123/520 |
| 3,646,731 A |   | 3/1972 | Hansen ....................... 55/316 |
| 3,683,597 A | * | 8/1972 | Beveridge et al. .......... 123/519 |
| 3,748,829 A | * | 7/1973 | Joyce et al. ................. 95/146 |
| 3,854,911 A |   | 12/1974 | Walker ....................... 55/387 |
| 3,861,557 A |   | 1/1975 | Tupper |
| 3,884,204 A | * | 5/1975 | Krautwurst et al. ........ 123/519 |
| 3,913,545 A |   | 10/1975 | Haase et al. ................ 123/136 |
| 4,028,075 A | * | 6/1977 | Roberge ...................... 96/139 |
| 4,083,344 A | * | 4/1978 | Sakurai et al. ............. 123/520 |
| 4,085,721 A | * | 4/1978 | Vardi et al. ................. 123/520 |
| 4,127,097 A | * | 11/1978 | Takimoto .................... 123/520 |

(Continued)

*Primary Examiner*—Thomas Moulis
(74) *Attorney, Agent, or Firm*—Baker & Daniels LLP

(57) ABSTRACT

An evaporative emissions control system for small internal combustion engines, including a charcoal canister which is in fluid communication with the air space above the liquid fuel within the carburetor of the engine and the air space above the liquid fuel within the fuel tank of the engine. The charcoal canister contains charcoal media, and when the engine is not running, fuel vapors from the carburetor and the fuel tank migrate to, and are trapped within, the charcoal media of the charcoal canister. The charcoal canister may comprise a separate component, or may be integrally formed with an engine component such as the air cleaner, the carburetor, or the body of the fuel tank, for example. During running of the engine, vacuum within the carburetor induces a flow of atmospheric air through the charcoal canister to purge the collected fuel vapors from the charcoal media, and the fuel vapors pass into the engine for consumption. In another embodiment, an evaporative emissions control system including a charcoal canister is provided for an engine which includes a fuel injection system.

21 Claims, 6 Drawing Sheets

U.S. PATENT DOCUMENTS

| | | | | |
|---|---|---|---|---|
| 4,149,504 A * | 4/1979 | Walters | ................ | 123/520 |
| 4,153,025 A * | 5/1979 | Thornburgh | ................ | 123/520 |
| 4,173,207 A * | 11/1979 | Hiramatsu | ................ | 123/519 |
| 4,175,526 A * | 11/1979 | Phelan | ................ | 123/520 |
| 4,193,383 A | 3/1980 | Rogers | ................ | 123/136 |
| 4,203,401 A | 5/1980 | Kingsley et al. | ................ | 123/136 |
| 4,224,044 A | 9/1980 | King | ................ | 55/385.1 |
| 4,261,717 A * | 4/1981 | Belore et al. | ................ | 96/112 |
| 4,283,356 A | 8/1981 | Arai et al. | ................ | 261/72 R |
| 4,300,511 A | 11/1981 | Lang | ................ | 123/520 |
| 4,308,840 A * | 1/1982 | Hiramatsu et al. | ................ | 123/519 |
| 4,312,649 A | 1/1982 | Fujii et al. | | |
| 4,403,587 A | 9/1983 | Mizuno et al. | ................ | 123/519 |
| 4,512,499 A | 4/1985 | Uuskallio | | |
| 4,548,624 A * | 10/1985 | Waller | ................ | 96/134 |
| 4,572,394 A | 2/1986 | Tanahashi et al. | | |
| 4,646,701 A | 3/1987 | Fukumoto | ................ | 123/519 |
| 4,701,198 A * | 10/1987 | Uranishi et al. | ................ | 96/148 |
| 4,702,216 A | 10/1987 | Haruta et al. | ................ | 123/520 |
| 4,790,445 A | 12/1988 | Shibata | | |
| 4,852,761 A | 8/1989 | Turner et al. | ................ | 220/85 |
| 4,877,146 A | 10/1989 | Harris | | |
| 4,884,716 A * | 12/1989 | Steiner | ................ | 220/202 |
| 4,919,103 A * | 4/1990 | Ishiguro et al. | ................ | 123/514 |
| 4,949,695 A * | 8/1990 | Uranishi et al. | ................ | 123/520 |
| 5,174,265 A * | 12/1992 | Sekine | ................ | 123/520 |
| 5,186,221 A * | 2/1993 | Ellis | ................ | 141/59 |
| 5,188,140 A | 2/1993 | Kosaka | ................ | 137/12 |
| 5,259,412 A | 11/1993 | Scott et al. | | |
| 5,408,977 A * | 4/1995 | Cotton | ................ | 123/520 |
| 5,649,639 A * | 7/1997 | Dolvet et al. | ................ | 220/257.1 |
| 5,704,337 A * | 1/1998 | Stratz et al. | ................ | 123/519 |
| 6,397,791 B1 | 6/2002 | Brister | | |
| 6,463,915 B2 | 10/2002 | Ozaki et al. | ................ | 123/519 |
| 6,640,770 B2 | 11/2003 | Woody | | |
| 6,698,403 B2 * | 3/2004 | Honda et al. | ................ | 123/520 |
| 6,941,925 B2 | 9/2005 | Yamada | | |
| 6,959,696 B2 * | 11/2005 | Shears et al. | ................ | 123/516 |
| 7,086,389 B2 | 8/2006 | Yamada | | |
| 7,104,258 B2 | 9/2006 | Yamada et al. | | |
| 2001/0029932 A1 * | 10/2001 | Ozaki et al. | ................ | 123/520 |
| 2006/0016436 A1 | 1/2006 | Groom et al. | | |
| 2006/0042604 A1 | 3/2006 | Haskew et al. | | |
| 2006/0086738 A1 | 4/2006 | Dehn et al. | | |
| 2006/0096583 A1 | 5/2006 | Shears et al. | | |
| 2006/0096584 A1 | 5/2006 | Shears et al. | | |
| 2006/0213487 A1 | 9/2006 | Mills | | |

* cited by examiner

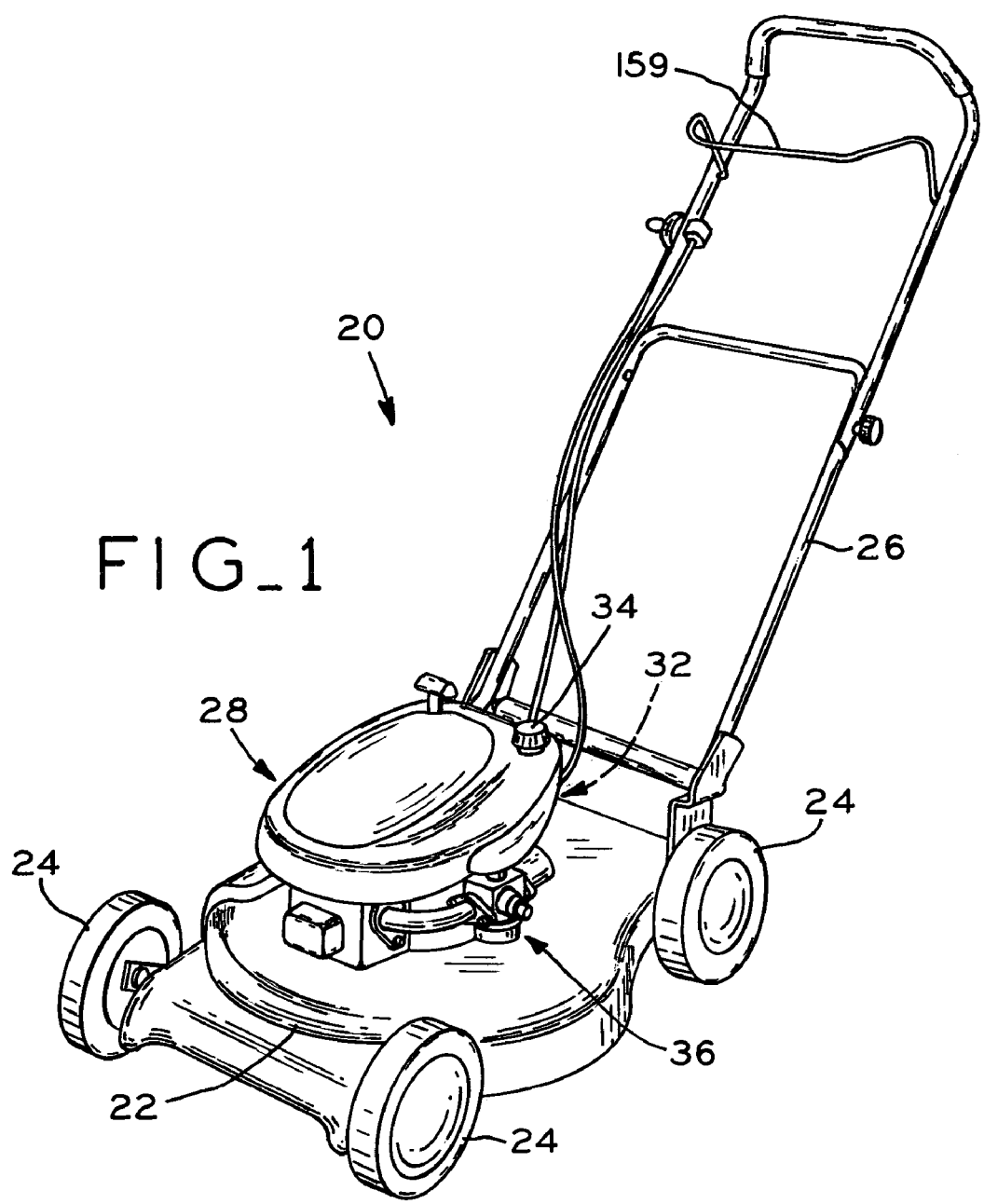
FIG_1
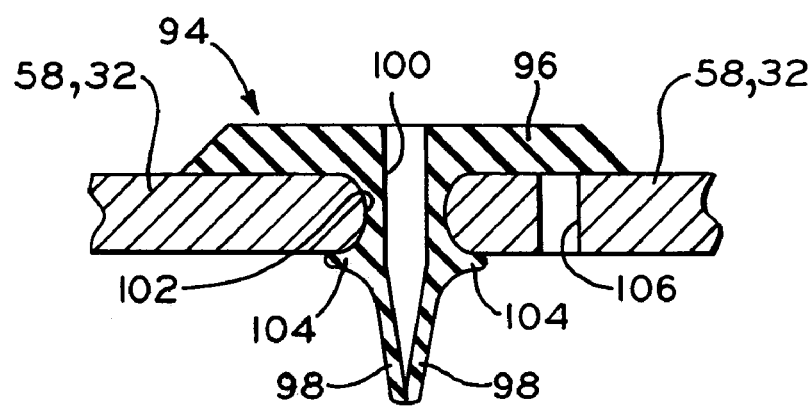
FIG_3

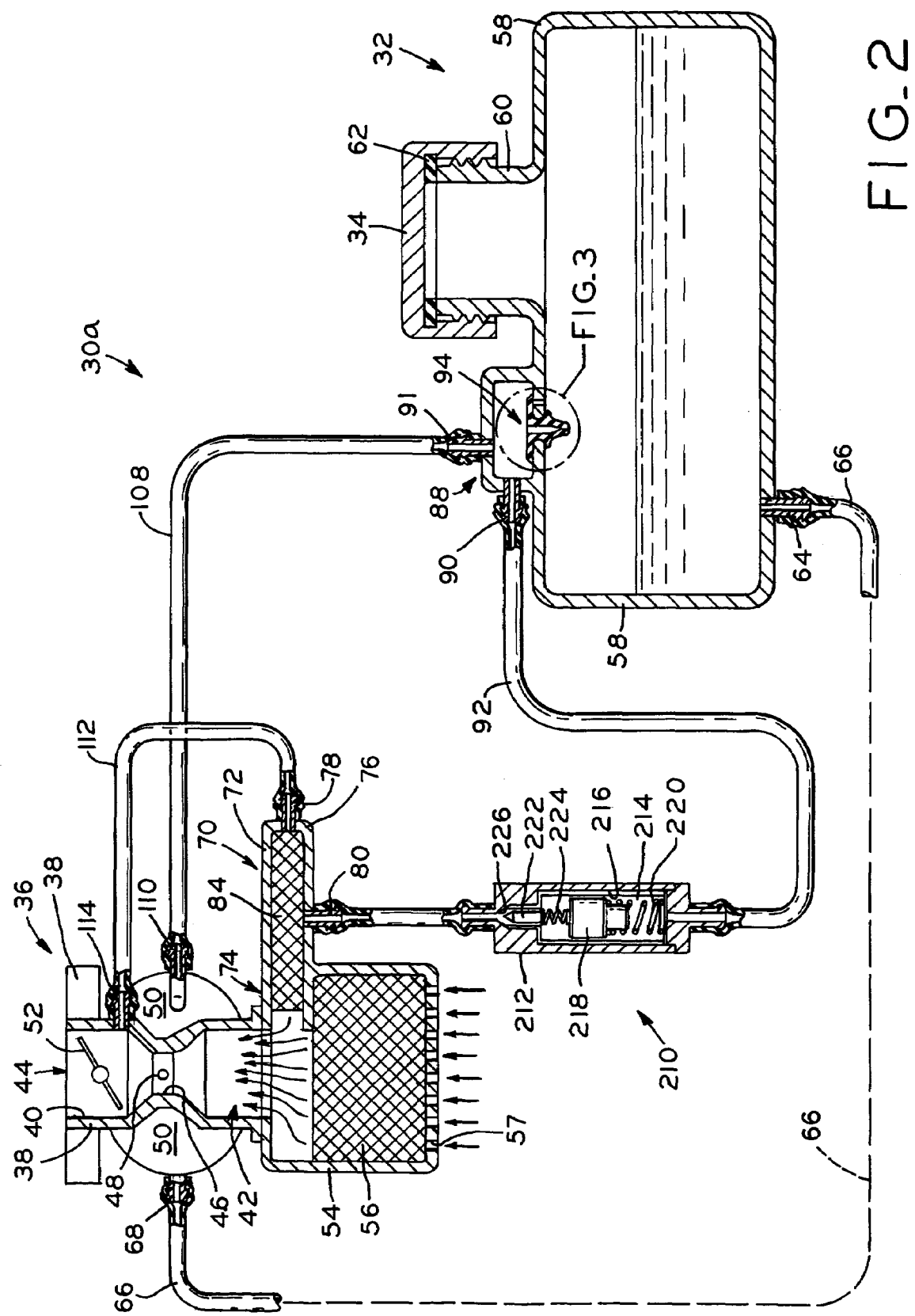
FIG._2

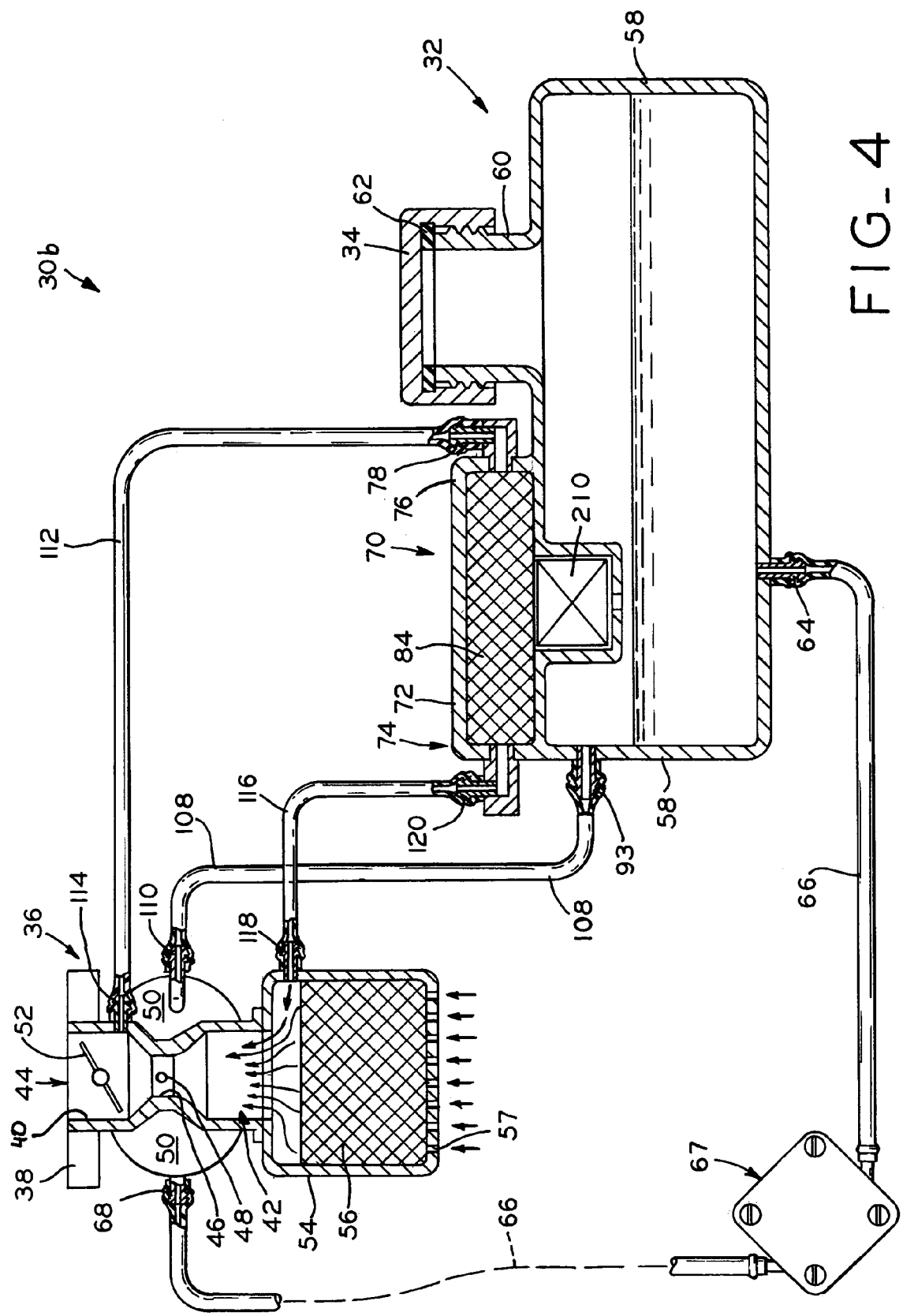
FIG_4

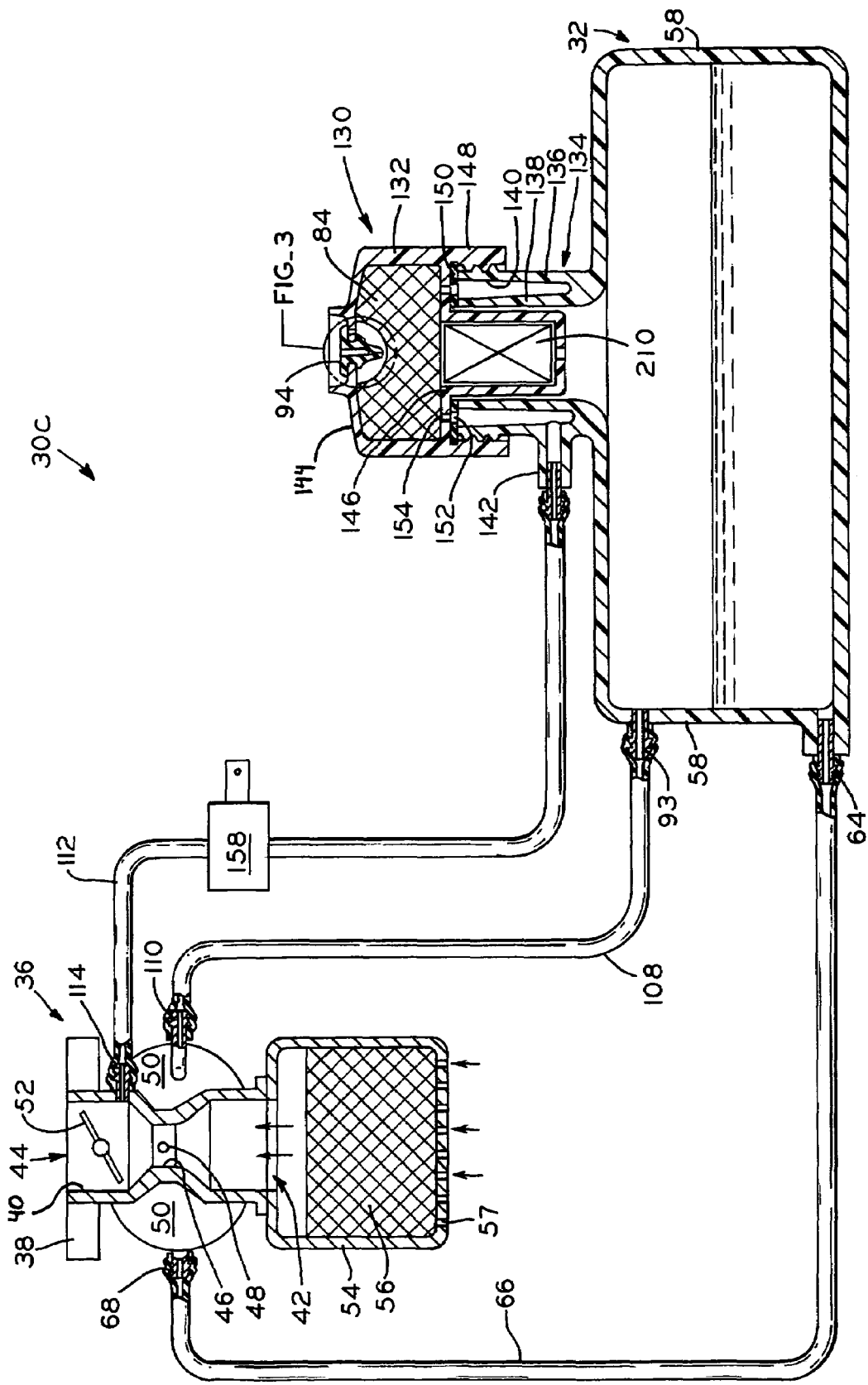

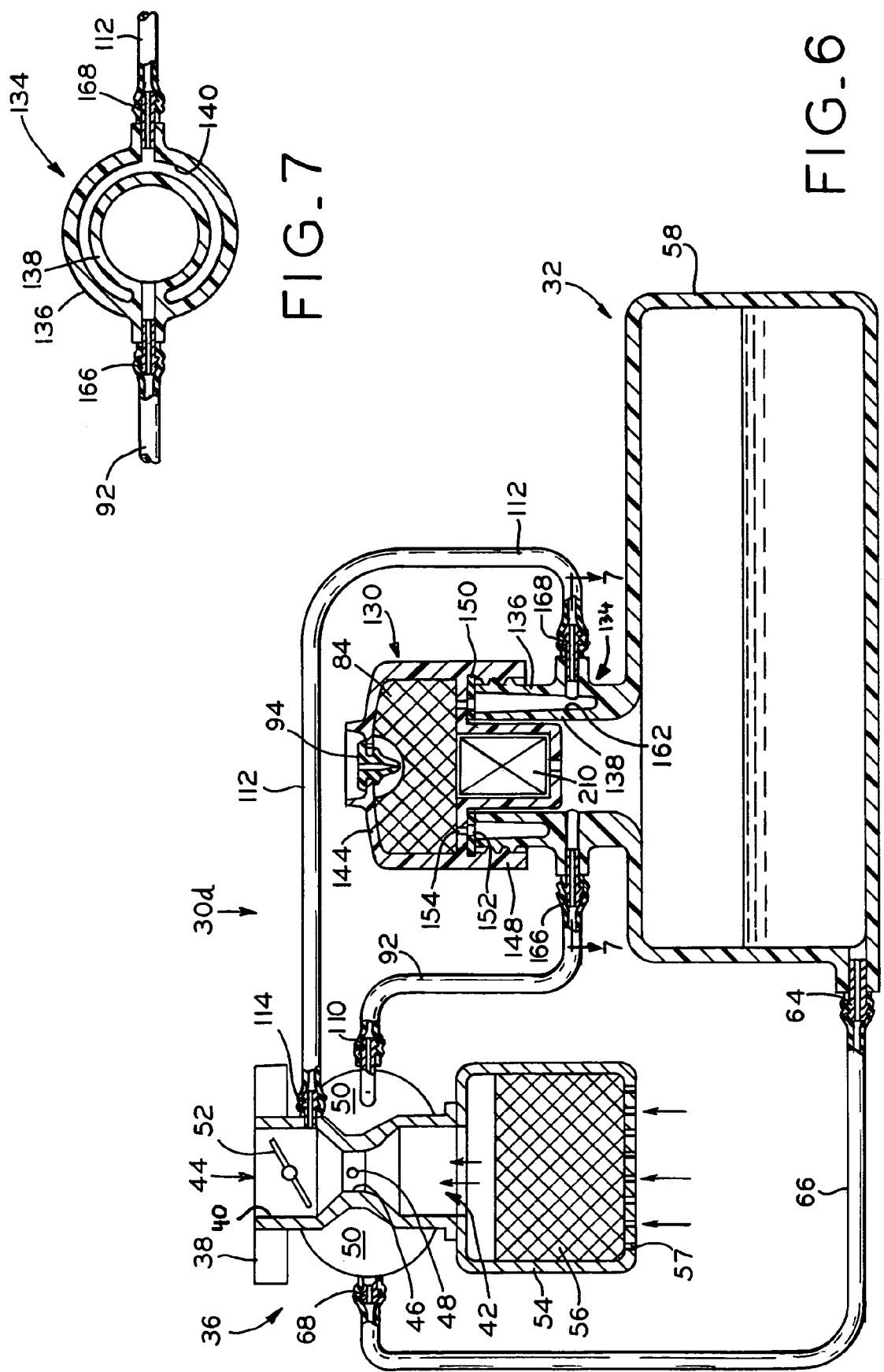

EVAPORATIVE EMISSIONS CONTROL SYSTEM INCLUDING A CHARCOAL CANISTER FOR SMALL INTERNAL COMBUSTION ENGINES

CROSS REFERENCE TO RELATED APPLICATIONS

This application claims the benefit under 35 U.S.C. § 119(e) of U.S. Provisional Patent Application Ser. No. 60/540,994, entitled EVAPORATIVE EMISSIONS CONTROL SYSTEM INCLUDING A CHARCOAL CANISTER FOR SMALL INTERNAL COMBUSTION ENGINES, filed on Feb. 2, 2004, as well as U.S. Provisional Patent Application Ser. No. 60/559,505, entitled EVAPORATIVE EMISSIONS CONTROL SYSTEM INCLUDING A CHARCOAL CANISTER FOR SMALL INTERNAL COMBUSTION ENGINES, filed on Apr. 5, 2004.

BACKGROUND OF THE INVENTION

1. Field of the Invention

The present invention relates to small internal combustion engines of the type used with lawnmowers, lawn tractors, other utility implements, and in sport vehicles, for example. In particular, the present invention relates to an evaporative emissions control system for such engines.

2. Description of the Related Art

Small internal combustion engines of the type used with lawnmowers, lawn tractors, other small utility implements, or in sport vehicles typically include an intake system including a carburetor attached to the engine which mixes liquid fuel with atmospheric air to form a fuel/air mixture which is drawn into the engine for combustion.

One known type of carburetor includes a fuel bowl containing a supply of liquid fuel which is drawn into the throat of the carburetor to mix with atmospheric air during running of the engine. A float within the fuel bowl actuates a valve which meters liquid fuel into the fuel bowl from a fuel tank. In another known type of carburetor, a diaphragm pump attached to the crankcase of the engine is actuated by pressure pulses within the engine to pump fuel from a fuel tank into a fuel chamber within the carburetor, from which the fuel is drawn into the throat of the carburetor to mix with atmospheric air.

In each of the foregoing arrangements, the carburetor is attached via a fuel line to a fuel tank, which stores a quantity of liquid fuel. The fuel tank includes a filler neck through which fuel may be filled into the fuel tank, and a fuel tank cap is attached to the filler neck to close the fuel tank. The fuel tank cap usually includes a venting structure for allowing any pressurized fuel vapors within the fuel tank to vent through the fuel tank cap to the atmosphere. Also, the venting structure allows atmospheric air to enter the fuel tank from the atmosphere as necessary to occupy the expanding volume within the fuel tank which is created as the fuel within the fuel tank is consumed by the engine.

Other small internal combustion engines include fuel injection systems for supplying liquid fuel from the fuel tank to an intake manifold of the engine.

A problem with the existing intake and fuel supply systems of such small internal combustion engines is that fuel vapors may escape from the fuel supply systems to the atmosphere, such as from the carburetor or from the fuel tank. For example, in a float bowl type carburetor, fuel vapors may escape to the atmosphere via the internal venting structure of the carburetor which connects the air space of the fuel bowl with the carburetor throat. Also, fuel vapors in the fuel tank may escape to the atmosphere through the venting structure in the fuel tank cap.

What is needed is a fuel supply system for small internal combustion engines which prevents the escape of fuel vapors to the atmosphere, thereby controlling and/or substantially eliminating fuel vapor emissions from such engines.

SUMMARY OF THE INVENTION

The present invention provides an evaporative emissions control system for small internal combustion engines, including a fuel vapor control device, such as a charcoal canister which is in fluid communication with the air space above the liquid fuel within the carburetor of the engine and the air space above the liquid fuel within the fuel tank of the engine. The charcoal canister contains charcoal media, and when the engine is not running, fuel vapors from the carburetor and the fuel tank migrate to, and are trapped within, the charcoal media of the charcoal canister. The charcoal canister may comprise a separate component, or may be integrally formed with an engine component such as the air cleaner, the carburetor, or the body of the fuel tank, for example. During running of the engine, vacuum within the carburetor induces a flow of atmospheric air through the charcoal canister to purge the collected fuel vapors from the charcoal media, and the fuel vapors pass into the engine for consumption. In another embodiment, an evaporative emissions control system including a charcoal canister is provided for an engine which includes a fuel injection system.

In one embodiment, the charcoal canister is integrally formed with the air cleaner or with the body of the fuel tank. The charcoal canister includes a long dimension having opposite ends each fluidly connected to a vacuum source within the carburetor, and a minor dimension having one or more fittings fluidly communicating the charcoal canister with the fuel bowl of the carburetor and with the fuel tank. When the engine is not running, fuel vapors from the fuel bowl of the carburetor and from the fuel tank migrate to the charcoal canister, and are trapped within the charcoal media, saturating the charcoal media from the central portion of the charcoal canister outwardly along the long dimension of the charcoal canister to most effectively utilize the volume of charcoal media for trapping fuel vapors. When the engine is running, a flow of purging atmospheric air is induced through the charcoal canister along its long dimension in one of two directions based upon the running conditions of the engine to ensure effective purging of the collected fuel vapors from the charcoal canister.

In another embodiment, a fuel tank cap, connected to the filler neck of the fuel tank, includes charcoal media which trap fuel vapors from the fuel tank. Additionally, the fuel tank cap is in fluid communication with the carburetor fuel bowl such that that fuel vapors from the carburetor fuel bowl migrate to, and are trapped within, the charcoal media of the fuel tank cap. During running of the engine, vacuum from the carburetor is communicated to the fuel tank cap, inducing an air flow through the fuel tank cap which purges the fuel vapors from the charcoal media in the fuel tank cap for consumption by the engine.

In an additional embodiment, the charcoal canister is in fluid communication with the intake manifold of the engine on opposite sides of a fuel injector body connected to the intake manifold. A fuel pump is disposed in a fuel supply line between the fuel tank and the fuel injector body. When the engine is not running, vapors from the fuel tank are trapped within the charcoal canister. When the engine is running, a vacuum is created in the intake manifold, inducing an air flow through the charcoal canister which purges the fuel vapors from the charcoal media for consumption by the engine. Concurrently, the fuel pump supplies fuel through the fuel supply line to the fuel injector body for injection into the intake manifold to combine with the intake air.

Advantageously, the present evaporative emissions control system facilitates the collection and trapping of fuel vapors from the fuel supply system of the engine within a charcoal canister to prevent the fuel vapors from exiting the fuel system of the engine to the atmosphere. During running of the engine, the collected fuel vapors are purged from the charcoal canister and are consumed within the engine. Further, operation of the present emissions control system requires no action on the part of the operator of the engine, and is fully automatic responsive to the running conditions of the engine.

In one form thereof, the present invention provides an internal combustion engine, including a carburetor having an intake air passage, and a fuel chamber in fluid communication with the passage, the chamber containing a volume of liquid fuel and an air space; a fuel tank in fluid communication with the fuel chamber, the fuel tank containing a volume of liquid fuel and an air space; and a fuel vapor control device including a housing containing fuel vapor absorbent media and having a substantially elongate profile with first and second ends and a central portion therebetween, at least one of the carburetor air space and the fuel tank air space in fluid communication with the central portion of the housing, the carburetor passage in fluid communication with one of the first and second ends and the other of the first and second ends in fluid communication with the atmosphere, whereby fuel vapors collect within the fuel vapor absorbent media, and passage of air through the carburetor passage induces a flow of air from the atmosphere through the housing to the carburetor passage to purge fuel vapors from the housing.

In another form thereof, the present invention provides an internal combustion engine operable at low and high speeds, including a carburetor including a passage through which engine intake air is drawn, the passage having an inlet and an outlet; a throttle valve disposed within the passage, the throttle valve movable between a substantially closed position corresponding to low engine speeds and a substantially open position corresponding to high engine speeds; and a fuel chamber in fluid communication with the passage, the fuel chamber containing a volume of liquid fuel and an air space; a fuel tank in fluid communication with the fuel chamber, the fuel tank containing a volume of liquid fuel and an air space; and a fuel vapor control device including a housing containing fuel vapor absorbent media, the housing in fluid communication with at least one of the carburetor air space and the fuel tank air space, and in fluid communication with the carburetor passage at a first location proximate the throttle valve and at a second location proximate the inlet; whereby fuel vapors collect within the fuel vapor absorbent media of the housing, and at low engine speeds, airflow through the carburetor passage with substantial closure of the throttle valve induces purging of fuel vapors from the housing in a direction from the second location to the first location, and at high engine speeds, airflow through the carburetor passage with substantial opening of the throttle valve induces purging of fuel vapors from the housing in a direction from the first location to the second location.

In anther form thereof, the present invention provides an internal combustion engine, including a carburetor having an intake air passage, and a fuel chamber in fluid communication with the passage, the chamber containing a volume of liquid fuel and an air space; a fuel tank in fluid communication with the fuel chamber, the fuel tank containing a volume of liquid fuel and an air space; and a fuel tank cap attached to the fuel tank and containing fuel vapor absorbent media, the fuel tank cap in fluid communication with the carburetor passage, the atmosphere, and with at least one of the fuel tank air space and the carburetor airspace; whereby fuel vapors collect within the fuel vapor absorbent media, and passage of air through the carburetor passage induces a flow of air from the atmosphere through the fuel tank cap to the carburetor passage to purge fuel vapors from the fuel tank cap.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein:

FIG. 1 is a perspective view of a lawnmower including an internal combustion engine having an evaporative emissions controls system in accordance with the present invention;

FIG. 2 is a schematic representation of a first embodiment of the evaporative emissions control system;

FIG. 3 is a fragmentary, partial sectional view through the fuel tank body, showing a combination valve used in the present evaporative emissions control systems;

FIG. 4 is a schematic representation of a second embodiment of the evaporative emissions control system;

FIG. 5 is a schematic representation of a third embodiment of the evaporative emissions control system;

FIG. 6 is a schematic representation of a fourth embodiment of the evaporative emissions control system;

FIG. 7 is a sectional view taken along line 7-7 of FIG. 6; and

Corresponding reference characters indicate corresponding parts throughout the several views. The exemplifications set out herein illustrate preferred embodiments of the invention, and such exemplifications are not to be construed as limiting the scope of the invention any manner.

DETAILED DESCRIPTION

Figure 8:
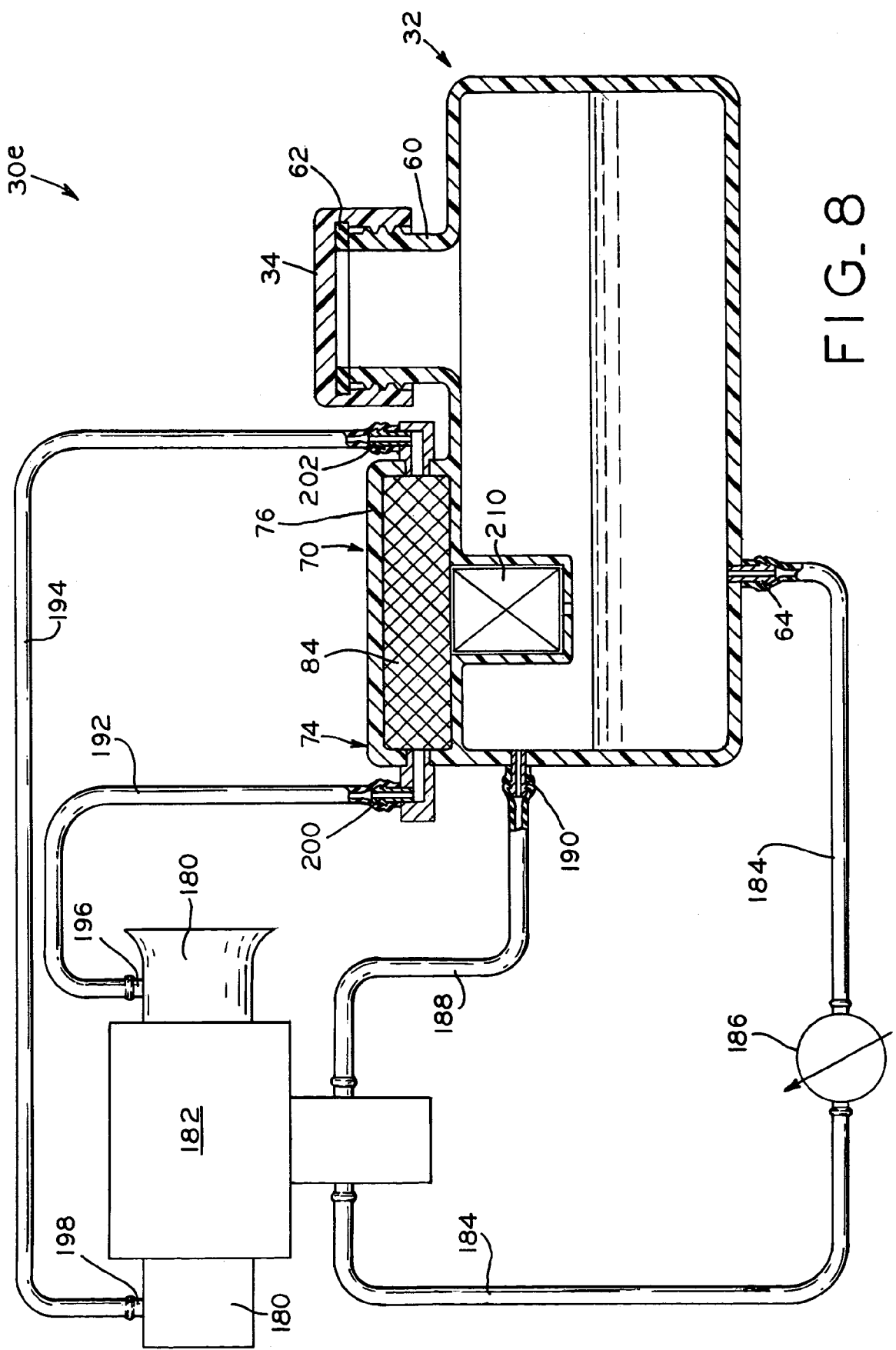
FIG. 8 is a schematic representation of a fifth embodiment of the evaporative emissions control system.

Referring first to FIG. 1, lawnmower 20 is shown as an example of an implement with which a small internal combustion engine may be used, the engine including an evaporative emissions control system of the present invention. Lawnmower 20 generally includes deck 22 having wheels 24, and a user-operable handle 26 extending upwardly from deck 22. A small internal combustion engine 28 is mounted to deck 22. Engine 28 is shown herein as a vertical crankshaft engine which drives a cutting blade (not shown) disposed beneath deck 22. However, the evaporative emissions control systems of the present invention are equally applicable to horizontal crankshaft engines, as well as engines having one, two, or more cylinders of the type commonly used with a variety of different types of implements, including lawnmowers, lawn and garden tractors, snow throwers, compressors, generators, and the like.

Engine 28 includes fuel tank 32 storing liquid fuel, with fuel tank 32 closed by fuel tank cap 34. Generally, as discussed further below, fuel tank 32 supplies liquid fuel to the fuel bowl of carburetor 36, which mixes the fuel with intake air to provide a fuel/air combustion mixture for engine 28.

Referring to FIG. 2, an evaporative emissions control system 30a in accordance with a first embodiment of the present invention is shown. As discussed below, the evaporative emissions control system disclosed herein include fuel vapor control devices, such as canisters, that contain a fuel absorbent media. An exemplary fuel absorbent media is charcoal, although other types of fuel absorbent media may also be used.

Carburetor 36 is connected to the intake passage (not shown) of engine 28, and generally includes carburetor body 38 having an intake air passage or throat 40 with inlet end 42, and outlet end 44 connected to the intake passage of engine 28. Throat 40 includes a constricted portion or venturi 46 proximate a main fuel jet 48 through which liquid fuel is drawn from fuel bowl 50 of carburetor 36 into throat 40 for mixing with intake air in a known manner during running of engine 28. Fuel bowl 50 is connected to carburetor body 38 in a suitable manner, and contains a volume of liquid fuel. Generally, fuel bowl 50 includes a float-type valve (not shown) for metering liquid fuel into fuel bowl 50 from fuel tank 32 via a gravity feed or pump feed, for example.

Disposed within throat 40 of carburetor 36 is a throttle valve plate 52, which is rotatable to vary the amount of air/fuel mixture which is supplied to engine 28, and therefore to in turn vary the running speed of engine 28. Throttle valve 52 is controlled by an operator of engine 28 and/or by the governor (not shown) of engine 28 through a suitable linkage arrangement, for example. Although carburetor 36 is shown herein as a fuel bowl or float-type carburetor, the evaporative emissions control systems of the present invention are equally applicable to diaphragm carburetors. Air cleaner 54 is attached to inlet end 42 of carburetor 36, and includes a housing containing filter media 56 for filtering dust, dirt, and other debris from the intake air which is drawn through inlet openings 57 in the housing of air cleaner 54.

Fuel tank 32 generally includes fuel tank body 58 and filler neck 60 having external threads. Fuel tank cap 34 includes internal threads for threaded attachment to filler neck 60 to close fuel tank 32. Gasket 62 is disposed within fuel tank cap 34 to provide a fluid tight seal between fuel tank cap 34 and filler neck 60 such that, when fuel tank cap 34 is attached to filler neck 60, air is prevented from entering fuel tank 32 from the atmosphere, and fuel vapors within fuel tank 32 are prevented from escaping fuel tank 32 to the atmosphere. Thus, fuel tank cap 34 is a "non-vented" cap, and differs from known fuel tank caps which include fuel tank venting arrangements. Fuel tank 32 stores a quantity of liquid fuel, which is supplied through fuel outlet 64 of fuel tank 34 and fuel supply line 66 to fuel inlet 68 of fuel bowl 50 of carburetor 36 by a gravity feed when fuel tank 32 is disposed above fuel bowl 50. Alternatively, a fuel pump, such as fuel pump 67 of FIG. 4, may be used to convey liquid fuel from fuel tank 32 to fuel bowl 50 during running of engine 28.

Evaporative emissions control system 30a includes a fuel vapor control device, shown as charcoal or carbon canister 70. As shown in FIG. 2, charcoal canister 70 may be integrally formed with air cleaner 54. Alternatively, charcoal canister 70 may be integrated into carburetor body 38, or may comprise a separate, stand-alone component attached to air cleaner 54, carburetor body 38, or another suitable portion of engine 28 or the implement with which engine 28 is used. The embodiments of FIGS. 4-8 include similar fuel vapor control devices, and the following discussion of same is also applicable thereto. Charcoal canister 70 includes a elongated housing 72 having an open first end 74 and an opposite second end 76 with fitting 78, wherein first and second ends 74 and 76 are oriented along the major dimension of charcoal canister 70. Fitting 80 is located near the central portion of charcoal canister 70 about the minor dimension of charcoal canister 70.

Charcoal canister 70 includes charcoal media 84 therein for trapping fuel vapors, as described further below. Charcoal media 84 may be in the form of small pellets of activated charcoal or carbon, or other suitable absorbent material, for example, and suitable charcoal media is available from many commercial sources, such as Sentec E&E Co., Ltd., of Taiwan, and MeadWestvaco Corporation, P.O. Box 14, Covington, Va. 24426. Charcoal media 84 is typically rated by its Normal Butane Capacity ("NBC") in g/ml. A typical NBC rating is 10, but carbon having capacities of up to 15 is commercially available.

Housing 72 of charcoal canister 70 has an elongate profile, such that the length of housing 72 is greater than its cross-sectional width. For example, housing 72 may have a length to cross sectional width aspect ratio of two, three, four, five, six, seven, or more for the reasons discussed below. In other words canister 70 may have a length to diameter ratio of from 1 to 7, more preferably from 2 to 7, most preferably from 3 to 7.

The volume of canister 70 is sized according to the volumetric capacity of fuel tank 32. A typical ratio of the volume of liquid fuel in tank 32 to the volume of charcoal media 84 within canister 70 is 16 for NBC 10 carbon, however, the foregoing may be varied with use of carbon having different NBC ratings. In one example, a fuel tank of a typical walk behind lawn mower engine having a volumetric capacity of 950 cc (1 quart), would require a canister having a volume of 60 cc using 10 NBC carbon, wherein use of 15 NBC carbon may allow the volume of the canister to be reduced 20% to 48 cc. In another example, a fuel tank of a larger engine, such as the engine of a riding lawnmower having a volumetric capacity of 4750 cc (5 quarts), would require a canister having a volume of 700 cc using 10 NBC carbon, wherein use of 15 NBC carbon may allow the volume of the canister to be reduced 20% to 380 cc.

Fuel tank 32 includes a vent housing 88 formed as a portion of the body 58 of fuel tank 32, with vent housing 88 including fittings 90 and 91. Vent line 92 connects fittings 90 and 80 to communicate vent housing 88 with charcoal canister 70. Combination valve 94 is mounted in fuel tank body 58, and is made of a resilient material such as rubber or a flexible plastic. Referring additionally to FIG. 3, combination valve 94 includes a head or flange 96, and a pair of flaps 98 about a main passageway 100 which extends through valve 94. Combination valve 94 may be attached to fuel tank body 58 by pressing valve 94 into opening 102 in fuel tank body 58, with catches 104 of flaps 98 engaging behind fuel tank body 58 with flaps 98 extending into the interior of fuel tank 32. Flaps 98 are "duck bill"-type flaps which are normally resiliently biased together to prevent air from passing from fuel tank 32 into vent housing 88. However, flaps 98 may flexibly separate from one another to permit air flow from vent housing 88 to fuel tank 32. Flange 96 of combination valve 94 normally overlays and closes hole 106 in fuel tank body 58. However, fuel vapors within fuel tank 32, when built to a sufficient pressure, may resiliently deflect flange 96 of combination valve 94 upwardly, such that the fuel vapors may pass through hole 106 into vent housing 88.

Referring back to FIG. 2, fuel bowl vent line 108 is connected between a fitting 110 of fuel bowl 50 and fitting 91 of vent housing to fluidly communicate the air space above the fuel within fuel bowl 50 with vent housing 88, and line 112 is connected between fitting 78 of charcoal canister 70 and a fitting 114 in carburetor body 38 which is disposed proximate throttle valve 52 to fluidly communicate throat 40 of carburetor with charcoal canister 70.

The operation of evaporative emissions control system 30a is as follows. When engine 28 is not running, fuel vapors above the liquid fuel in fuel tank 32 are trapped within fuel tank 32 by fuel tank cap 34 and combination valve 94. When the fuel vapors build to a sufficient pressure within fuel tank 32, the fuel vapors deflect flange 96 (FIG. 3) of combination valve 94 and pass through hole 106 in fuel tank body 58 into vent housing 88. Thereafter, the fuel vapors pass through vent line 92 into charcoal canister 70, where the fuel vapors are trapped within charcoal media 84. Similarly, fuel vapors above the liquid fuel within fuel bowl 50 of carburetor 36 may pass through fuel bowl vent line 108 into vent housing 88 and thence through vent line 92 into charcoal canister 70, where the fuel vapors are trapped within charcoal media 84. In this manner, evaporative emissions control system 30a is closed to the atmosphere when engine 28 is not running, and fuel vapors within the fuel supply system of engine 28 are trapped within charcoal canister 70.

Advantageously, fitting 80 of charcoal canister 70, through which fuel vapors pass into charcoal media 84, is disposed at the central portion of charcoal canister 70. Thus, fuel vapors from fuel tank 32 and fuel bowl 50 saturate the charcoal media 84 progressively from the center of charcoal canister 70 horizontally outwardly toward the opposite first and second ends 74 and 76 of charcoal canister 70. In this manner, the interior volume of charcoal canister 70 is most effectively utilized for trapping fuel vapors within charcoal media 84.

When engine 28 is started, the collected fuel vapors trapped within charcoal media 84 are purged from charcoal media 84 and consumed within engine 28. Specifically, during low load engine running conditions, throttle valve 52 is mostly closed, such that the passage of air through throat 40 of carburetor 36 generates a relatively strong vacuum proximate throttle valve 52 and fitting 114 of line 112. This vacuum is communicated through line 112 to fitting 78 at second end 76 of charcoal canister 70 as air is concurrently drawn into throat 40 and first end 74 of charcoal canister 70, thereby inducing a flow of atmospheric air axially through charcoal canister 70 from its first end 74 to its second end 76. The air flow through charcoal canister 70 purges the fuel vapors from charcoal media 84, and the fuel vapors are carried with the atmospheric air through line 112 into throat 40 of carburetor 36 for consumption by engine 28.

At high engine running speeds, throttle valve 52 is mostly fully open, such that a relatively weak vacuum is generated near throttle valve 52. However, during high engine running speeds at which throttle valve 52 is substantially wide open, a strong air flow is induced through throat 40 of carburetor 36, which air flow passes open end 74 of canister 70 to induce an air flow through canister 70 from second end 76 to first end 74 of charcoal canister 70 in an opposite direction to that described above. In these conditions, fuel vapors are purged from charcoal media 84 into the main induction air stream through throat 40 of carburetor 36 and into engine 28 for consumption. Therefore, based upon the running conditions of engine 28, fuel vapors within charcoal media 84 may be purged from charcoal canister 70 in either one of the above-described two directions, resulting in an effective, thorough purging of the collected fuel vapors from charcoal canister 70.

During running of engine 28, atmospheric make-up air may enter charcoal canister 70 during purging of fuel vapors as described above, and a portion of this air may pass through vent line 92 into vent housing 88, and thereafter through flaps 98 of combination valve 94 into fuel tank 32 as necessary to occupy the expanded air volume created by the consumption of liquid fuel from fuel tank 32 during running of engine 28.

Referring to FIG. 2, evaporative emissions control system 30a also includes an anti-rollover valve 210 in vent line 92 to prevent liquid fuel from passing from fuel tank 32 or fuel bowl 50 into charcoal canister 70. Anti-rollover valve 210 includes valve body 212 having fittings for vent line 92. Valve body 212 includes central bore 214 having one or more grooves 216 therein. Weight 218 is normally biased upwardly by main spring 220, and needle valve member 222 is connected to weight 218 by secondary spring 224, which is in tension. Normally, when valve body 212 is disposed in a substantially vertical orientation, as shown in FIG. 2, the gravitational force on weight 218 overcomes the bias force of main spring 220, such that secondary spring 224 and needle valve member 222 are positioned away from valve seat 226, allowing passage of vapors through valve body 212 around weight 218 through grooves 216, and thence through valve seat 226. When the orientation of valve body 212 moves toward a substantially horizontal position, such as when lawnmower 20 and engine 28 (FIG. 1) are tipped, main spring 220 overcomes the gravitational force upon weight 218 and biases weight 218 toward valve seat 226, such that secondary spring 224 and needle valve member 222 are biased into engagement with valve seat 226, preventing passage of vapors or liquid fuel through valve body 212. When valve body 212 is returned to a substantially vertical position, operation of the foregoing components is reversed to open valve 210, wherein secondary spring 224 operates to prevent needle valve member 222 from sticking to valve seat 226. Evaporative emissions control systems 30b, 30c, 30d, and 30e of FIGS. 4-8 also include anti-rollover valves 210; however, the structural details of anti-rollover valve 210 are omitted from FIGS. 4-8 for clarity.

Evaporative emissions control system 30b according to a second embodiment is shown in FIG. 4, in which identical reference numerals are used to denote identical or substantially identical components between the first and second embodiments. Evaporative emissions control system 30b of FIG. 4 includes charcoal canister 70 integrally formed with body 58 of fuel tank 32, and anti-rollover valve 210 is disposed within fuel tank body 32 and fluidly communicates directly with charcoal canister 70. Line 116 is connected between fitting 118 of air cleaner 54 and fitting 120 of charcoal canister 70 to fluidly communicate air cleaner 54 and charcoal canister 70. Fuel bowl vent line 108 is connected between fitting 110 of fuel bowl 50 and fitting 93 of fuel tank.

As shown in FIG. 4, fuel supply line 66 may include fuel pump 67 for pumping fuel from fuel tank 32 to fuel bowl 50 of carburetor 36. Fuel pump 67 may be a diaphragm-type fuel pump actuated by pressure pulses within the crankcase of engine 28, or alternatively, may be an electrical pump or a shaft-driven type pump driven from engine 28. Each of the embodiments of FIGS. 2, 4, 5, and 6 may also optionally include fuel pump 67. Fuel pump 67 may be included in fuel supply line 66 where fuel tank 32 is disposed at the same level or lower than carburetor 36, for example, where a gravity fuel feed through fuel supply line 66 may not be effective. Also, fuel pump 67 may be needed to force fuel from fuel tank 32 such that make-up air may more easily enter fuel tank 32 through combination valve 94, particularly when the level of fuel in fuel tank 32 is low, and gravity feed of fuel through fuel supply line 66 is less effective.

The operation of evaporative emissions control system 30b is similar to the operation of evaporative emissions control system 30a described above. Specifically, when engine 28 is not running, fuel vapors within fuel tank 32 pass through anti-rollover valve 210 into charcoal media 84 of charcoal canister 70, where the fuel vapors are trapped. Similarly, fuel vapors may pass from fuel bowl 50 through fuel bowl vent line 108 into fuel tank 32, and thence through anti-rollover valve 210 into charcoal canister 70 where the fuel vapors are trapped by the charcoal media 84.

When engine 28 is running at low load conditions, a relatively strong vacuum is communicated through line 112 to charcoal canister 70. Concurrently, atmospheric air is drawn into charcoal canister 70 through line 116. The foregoing induces atmospheric air flow through charcoal canister 70 from its first end 74 to its second end 76, thereby purging the fuel vapors from charcoal media 84 through line 112 into throat 40 of carburetor 36 for consumption within engine 28. At high engine running speeds, the strong air flow through air cleaner 54 and throat 40 of carburetor 36 induces an air flow through line 112 and through charcoal canister 70 from its second end 76 to its first end 74, thereby purging the fuel vapors from charcoal media 84 through line 116 into air cleaner 54 and throat 40 of carburetor 36 for consumption within engine 28.

Evaporative emissions control system 30c according to a third embodiment is shown in FIG. 5, in which identical reference numerals are used to denote identical or substantially identical components between the first, second, and third embodiments. Evaporative emissions control system 30c does not include charcoal canister 70, but rather includes fuel tank cap 130 having an integral charcoal housing 132. Filler neck 134 of fuel tank 32 includes annular outer wall 136 having external threads, and annular inner wall 138. Annular well 140 is defined between outer wall 136 and inner wall 138 within filler neck 134. Outer wall 136 additionally includes fitting 142 for connection to vent line 112.

Charcoal housing 132 of fuel tank cap 130 contains charcoal media 84, and fuel tank cap 130 additionally includes upper wall 144 and lower wall 146. Skirt portion 148 depends from lower wall 146, and includes internal threads for engaging the external threads of outer wall 136 of filler neck 134 for screw-threaded attachment of fuel tank cap 130 to filler neck 134. Gasket 150 is disposed between fuel tank cap 130 and filler neck 134 to provide a seal therebetween, and gasket 150 includes one or more holes 152. Lower wall 146 of fuel tank cap 130 includes anti-rollover valve 210 of the type described above, which extends into filler neck 134, as well as a plurality of holes 154 in alignment with holes 152 of gasket 150, wherein both holes 152 and 154 are in communication with well 140 of filler neck 134. Alternatively, rather than holes 152 and 154, gasket 150 and lower wall 146 of fuel tank cap 130 may include mutually aligned slots or other openings. Upper wall 144 of fuel tank cap 130 also includes a combination valve 94 of the type described above.

Referring to FIG. 5, a shut-off valve 158 is disposed within vacuum line 112. Shut-off valve 158 is normally closed when engine 28 is not running to block communication between throat 40 of carburetor 36 and charcoal housing 132, and shut-off valve 158 is normally open when engine 28 is running. Shut-off valve 158 may be operatively connected with the bail assembly 159 on handle 26 of lawnmower 20 (FIG. 1), for example, or may be connected in another suitable manner mechanically or electrically with another suitable operator control of an implement with which engine 28 is used, such that shut-off valve 158 opens just prior to, or contemporaneously with, the starting of engine 28 and remains open during running of engine 28. Alternatively, shut-off valve 158 may be directly responsive to the running of engine 28 itself, for example, shut-off valve 158 may be opened and closed responsive to centrifugal forces via a connection to a rotating shaft driven from engine 28 in the manner disclosed in U.S. Provisional Application Ser. No. 60/508,363, entitled CENTRIFUGALLY OPERATED EVAPORATIVE EMISSIONS CONTROL SYSTEM FOR INTERNAL COMBUSTION ENGINES, filed on Oct. 3, 2003, the disclosure of which is incorporated herein by reference. Fuel bowl vent line 108 is connected between fitting 110 of fuel bowl 50 and fitting 93 of fuel tank 32.

The operation of evaporative emissions control system 30c is as follows. When engine 28 is not running, fuel vapors above the liquid fuel in fuel tank 32 are trapped within fuel tank 32 by fuel tank cap 130, and pass through anti-rollover valve 210 of fuel tank cap 130 and into charcoal housing 132 of fuel tank cap 130 where the fuel vapors are trapped by charcoal media 84. Similarly, fuel vapors above the liquid fuel within fuel bowl 50 of carburetor 36 may pass through fuel bowl vent line 108 into fuel tank 32, and thence through anti-rollover valve 210 of fuel tank cap 130 and into charcoal housing 132 of fuel tank cap 130, where the fuel vapors are trapped by charcoal media 84. In this manner, evaporative emissions control system 30c is closed to the atmosphere when engine 28 is not running, and fuel vapors within the fuel supply system of engine 28 are trapped within fuel tank cap 130.

Upon starting of engine 28, shut-off valve 158 is opened, and the passage of intake air through throat 40 of carburetor 36 creates a vacuum which is communicated through vacuum line 112 to well 140, and thence through holes 152 of gasket 150 and holes 154 in lower wall 146 of fuel tank cap 130 to charcoal housing 132 of fuel tank cap 130. Concurrently, atmospheric air may enter charcoal housing 132 through the combination valve 94 in upper wall 144 of fuel tank cap 130, thereby inducing a flow of air through charcoal housing 132 to purge the collected fuel vapors from charcoal media 84 and draw same into throat 40 of carburetor 36, where the fuel vapors are consumed by engine 28. As necessary during running of engine 28, atmospheric make-up air may pass through combination valve 94 in upper wall 144 of fuel tank cap 130 and enter fuel tank 32 via anti-rollover valve 210 to occupy the expanding air volume within fuel tank 32 which is created as the liquid fuel within fuel tank 32 is consumed by engine 28. Upon shutdown of engine 28, shut-off valve 158 automatically closes to return evaporative emissions control system 30c to its closed state, described above.

Evaporative emissions control system 30d, according to a fourth embodiment, is shown in FIGS. 6 and 7, in which identical reference numerals are used to denote identical or substantially identical components between the first, second, third, and fourth embodiments. Evaporative emissions control system 30d is similar to evaporative emissions control system 30c in that same includes fuel tank cap 130 with charcoal housing 132.

Referring to FIGS. 6 and 7, outer and inner walls 136 and 138 of filler neck 134 define well in filler neck 134, and outer wall 136 of filler neck 134 includes a pair of fittings 166 and 168 for connection to vent line 92 and to vacuum line 112, respectively. Additionally, upper wall 144 of fuel tank cap 130 lacks a hole 106 therein beneath flange 96 of combination valve 94 (FIG. 3), such that air from the atmosphere may pass through combination valve 94 into charcoal housing 132 of fuel tank cap 130, but air within charcoal housing 132 of fuel tank cap 130 is prevented from exiting fuel tank cap 130 through this combination valve 94.

In use, when engine 28 is not running, fuel vapors above the liquid fuel in fuel tank 32 are trapped within fuel tank 32 by fuel tank cap 130, and pass through anti-rollover valve 210 of fuel tank cap 130 into charcoal housing 132 of fuel tank cap 130, where the vapors are trapped by charcoal media 84. Similarly, fuel vapors above the liquid fuel within fuel bowl 50 of carburetor 36 may pass through fuel bowl vent line 92 into filler neck 134, and thereafter through anti-rollover valve 210 of fuel tank cap 130 and into charcoal housing 132, where the fuel vapors are trapped by charcoal media 84. In this manner, evaporative emissions control system 30d is closed to the atmosphere when engine 28 is not running, and fuel vapors within the fuel supply system of engine 28 are trapped within fuel tank cap 130.

When engine 28 is started, passage of air through throat 40 of carburetor 36 creates a vacuum which is communicated through vacuum line 112 to second well 162 of filler neck 134, and thence through holes 152 in gasket 150 and holes 154 in lower wall 146 of fuel tank cap 130 into charcoal housing 132. Concurrently, atmospheric air may enter charcoal housing 132 through the combination valve 94 in upper wall 144 of fuel tank cap 130, thereby inducing a flow of air through charcoal housing 132 to purge the collected fuel vapors from charcoal media 84 and draw same into throat 40 of carburetor 36, where the fuel vapors are consumed by engine 28. As necessary during running of engine 28, atmospheric make-up air may pass through the combination valve 94 of fuel tank cap 130 and enter fuel tank 32 to occupy the expanding air volume within fuel tank 32 which is created as the liquid fuel within fuel tank 32 is consumed by engine 28.

Evaporative emissions control system 30e, according to a fifth embodiment, is shown in FIG. 8, in which identical reference numerals are used to denote identical or substantially identical components between the first, second, third, fourth, and fifth embodiments. Evaporative emissions control system 30e is similar to evaporative emissions control system 30b of FIG. 4 in that same includes charcoal canister 70 integral with fuel tank 32. However, the charcoal canister 70 of evaporative emissions control system 30e may also optionally be configured as shown in the embodiments of FIGS. 2, 5, and 6.

As shown in FIG. 8, evaporative emissions control system 30e is for use with a small internal combustion engine 28 which includes a fuel injection system. Intake manifold 180 includes fuel injector body 182 connected thereto, with fuel injector body 182 including at least one fuel injector nozzle (not shown) in fluid communication with intake manifold 180. Fuel supply line 184 is connected to fuel outlet 64 of fuel tank 32, and fuel pump 186 is disposed within fuel supply line 184 to supply liquid fuel under pressure to fuel injector body 182. Fuel return line 188 is connected between fuel injector body 182 and fuel inlet 190 of fuel tank 32 to return excess fuel from fuel injector body 182 to fuel tank 32. Fuel pump 186 may be a diaphragm-type fuel pump actuated by pressure pulses within the crankcase of engine 28, or alternatively, may be an electrical pump or a shaft-driven pump driven from engine 28. Fuel vent lines 192 and 194 are connected to inlet manifold 180 upstream and downstream of fuel injector body 182 at fittings 196, 198, respectively, and are also connected to fittings 200 and 202, respectively, at opposite ends of charcoal canister 70.

In use, when engine 28 is not running, the fuel injector nozzle of fuel injector body 182 is closed, such that liquid fuel does not enter intake manifold 180 of engine 28. Additionally, fuel vapors from within the interior of fuel tank 32 pass through anti-rollover valve 210 as described above, and are trapped within charcoal media 84 of charcoal canister 70. When engine 28 is running, fuel pump 186 is actuated to supply fuel under high pressure through fuel supply line 184 from fuel tank 32 to fuel injector body 182, and a portion of the fuel is injected by fuel injector body 182 into intake manifold 180 for combining with the intake air to supply a fuel/air combustion mixture to engine 28 for combustion. The remainder of the fuel at a lesser pressure returns to fuel tank 32 through fuel return line 188. In this manner, a continuous fuel supply loop is maintained between fuel tank 32 and fuel injector body 182 with the continuous supply of fuel through the fuel loop aiding the cooling of fuel injector body 182.

Additionally, the passage of intake air through intake manifold 180 creates a vacuum in intake air manifold 180, which induces a flow of air through vent line 192 into first end 74 of charcoal canister 70, and outward through second end 76 of charcoal canister 70 through vent line 194 into intake manifold 180 to purge fuel vapors from charcoal canister 70 when engine 28 is running, which fuel vapors are consumed by engine 28. Upon shutdown of engine 28, operation of fuel pump 186 ceases, and fuel injector body 182 closes to return evaporative emissions control system 30e to its closed state, described above.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An internal combustion engine, comprising:
   a carburetor having an intake air passage, and a fuel chamber in fluid communication with said passage, said chamber containing a volume of liquid fuel and an air space;
   a fuel tank in fluid communication with said fuel chamber, said fuel tank containing a volume of liquid fuel and an air space; and
   a fuel vapor control device including a housing containing fuel vapor absorbent media and having a substantially elongate profile along an axis, said housing defining first and second ends and a central portion therebetween, said carburetor passage in fluid communication with one of said first and second ends and the other of said first and second ends in fluid communication with the atmosphere, at least one of said carburetor air space and said fuel tank air space in fluid communication with said central portion of said housing at a location on said housing disposed axially in between said first and second ends;
   whereby fuel vapors collect within said fuel vapor absorbent media initially within said central portion of said housing and thereafter outwardly toward said first and second ends, and passage of air through said carburetor passage induces a flow of air from the atmosphere axially through said housing to said carburetor passage to purge fuel vapors from said housing.

2. The internal combustion engine of claim 1, wherein said fuel vapor absorbent media is charcoal media.

3. The internal combustion engine of claim 1, wherein said housing includes a length between said first and second ends and a width, said length at least twice said width.

4. The internal combustion engine of claim 1, wherein said housing is in fluid communication with said carburetor air space and with said fuel tank air space.

5. The internal combustion engine of claim 1, further comprising an air cleaner in airflow communication with said carburetor passage, said housing integrally formed with said air cleaner.

6. The internal combustion engine of claim 1, wherein said fuel tank includes a body, said housing integrally formed with said fuel tank body.

7. An internal combustion engine operable at low and high speeds, comprising:
a carburetor, comprising:
a passage through which engine intake air is drawn, said passage having an inlet and an outlet;
a throttle valve disposed within said passage, said throttle valve movable between a substantially closed position corresponding to low engine speeds and a substantially open position corresponding to high engine speeds; and
a fuel chamber in fluid communication with said passage, said fuel chamber containing a volume of liquid fuel and an air space;
a fuel tank in fluid communication with said fuel chamber, said fuel tank containing a volume of liquid fuel and an air space; and
a fuel vapor control device including a housing containing fuel vapor absorbent media, said housing in fluid communication with at least one of said carburetor air space and said fuel tank air space, and in fluid communication with said carburetor passage at a first location proximate said throttle valve and at a second location proximate said inlet;
whereby fuel vapors collect within said fuel vapor absorbent media of said housing, and at low engine speeds, airflow through said carburetor passage with substantial closure of said throttle valve induces purging of fuel vapors from said housing in a direction from said second location to said first location, and at high engine speeds, airflow through said carburetor passage with substantial opening of said throttle valve induces purging of fuel vapors from said housing in a direction from said first location to said second location.

8. The internal combustion engine of claim 7, wherein said fuel vapor absorbent media is charcoal media.

9. The internal combustion engine of claim 7, wherein said housing is in fluid communication with said carburetor air space and with said fuel tank air space.

10. The internal combustion engine of claim 7, further comprising an air cleaner in airflow communication with said carburetor passage, said housing integrally formed with said air cleaner.

11. The internal combustion engine of claim 7, wherein said fuel tank includes a body, said housing integrally formed with said fuel tank body.

12. The internal combustion engine of claim 7, wherein said housing is elongate and includes first and second ends, said first end in fluid communication with said carburetor at said first location and said second end in fluid communication with said carburetor at said second location.

13. The internal combustion engine of claim 12, wherein said housing includes a length between said first and second ends and a width, said length at least twice said width.

14. The internal combustion engine of claim 12, wherein said housing includes a central portion between said first and second ends, said central portion in fluid communication with at least one of said carburetor air space and said fuel tank air space.

15. An internal combustion engine, comprising:
a carburetor having an intake air passage, and a fuel chamber in fluid communication with said passage, said chamber containing a volume of liquid fuel and an air space;
a fuel tank in fluid communication with said fuel chamber, said fuel tank containing a volume of liquid fuel and an air space; and
a fuel tank cap attached to said fuel tank and containing fuel vapor absorbent media, said fuel tank cap in fluid communication with said carburetor passage, the atmosphere, and with said fuel tank air space and said carburetor air space;
whereby fuel vapors collect within said fuel vapor absorbent media, and passage of air through said carburetor passage induces a flow of air from the atmosphere through said fuel tank cap to said carburetor passage to purge fuel vapors from said fuel tank cap.

16. The internal combustion engine of claim 15, wherein said fuel vapor absorbent media is charcoal media.

17. The internal combustion engine of claim 15, wherein said fuel tank cap includes a check valve therein to allow one-way flow of air from the atmosphere into said fuel tank cap.

18. An internal combustion engine, comprising:
a carburetor having an intake air passage, and a fuel chamber in fluid communication with said passage, said chamber containing a volume of liquid fuel and an air space;
a fuel tank in fluid communication with said fuel chamber, said fuel tank containing a volume of liquid fuel and an air space; and
a fuel vapor control device including a housing containing fuel vapor absorbent media, said carburetor air space and said fuel tank air space in fluid communication with said housing, said carburetor passage in fluid communication with said housing and said housing further in fluid communication with the atmosphere; and
a gravity-responsive valve disposed between said fuel tank air space and said fuel vapor control device;
whereby fuel vapors collect within said fuel vapor absorbent media, and passage of air through said carburetor passage induces a flow of air from the atmosphere through said housing to said carburetor passage to purge fuel vapors from said housing.

19. The internal combustion engine of claim 18, wherein said gravity-responsive valve includes a valve body, said valve normally open when said valve body is disposed in a substantially vertical position, said valve closing when said valve body is rotated toward a substantially horizontal position.

20. An internal combustion engine, comprising:
a fuel tank including a filler neck, said fuel tank containing a volume of liquid fuel and an air space; and
a fuel tank cap attached to said filler neck of said fuel tank and containing fuel vapor absorbent media, said fuel tank cap in fluid communication with said fuel tank and with the atmosphere, a portion of said fuel tank cap projecting into said filler neck and including liquid fuel blocking structure;
whereby fuel vapors collect within said fuel vapor absorbent media and liquid fuel from said fuel tank is blocked from contacting said fuel vapor absorbent media by said liquid fuel blocking structure.

21. The internal combustion engine of claim 20, wherein said liquid fuel blocking structure of said fuel tank cap portion includes an anti-rollover valve.

* * * * *